April 26, 1932.  G. L. BAYLEY  1,855,662
MACHINE FOR GENERATING CURVED GEAR TEETH
Filed Dec. 8, 1926  2 Sheets-Sheet 2
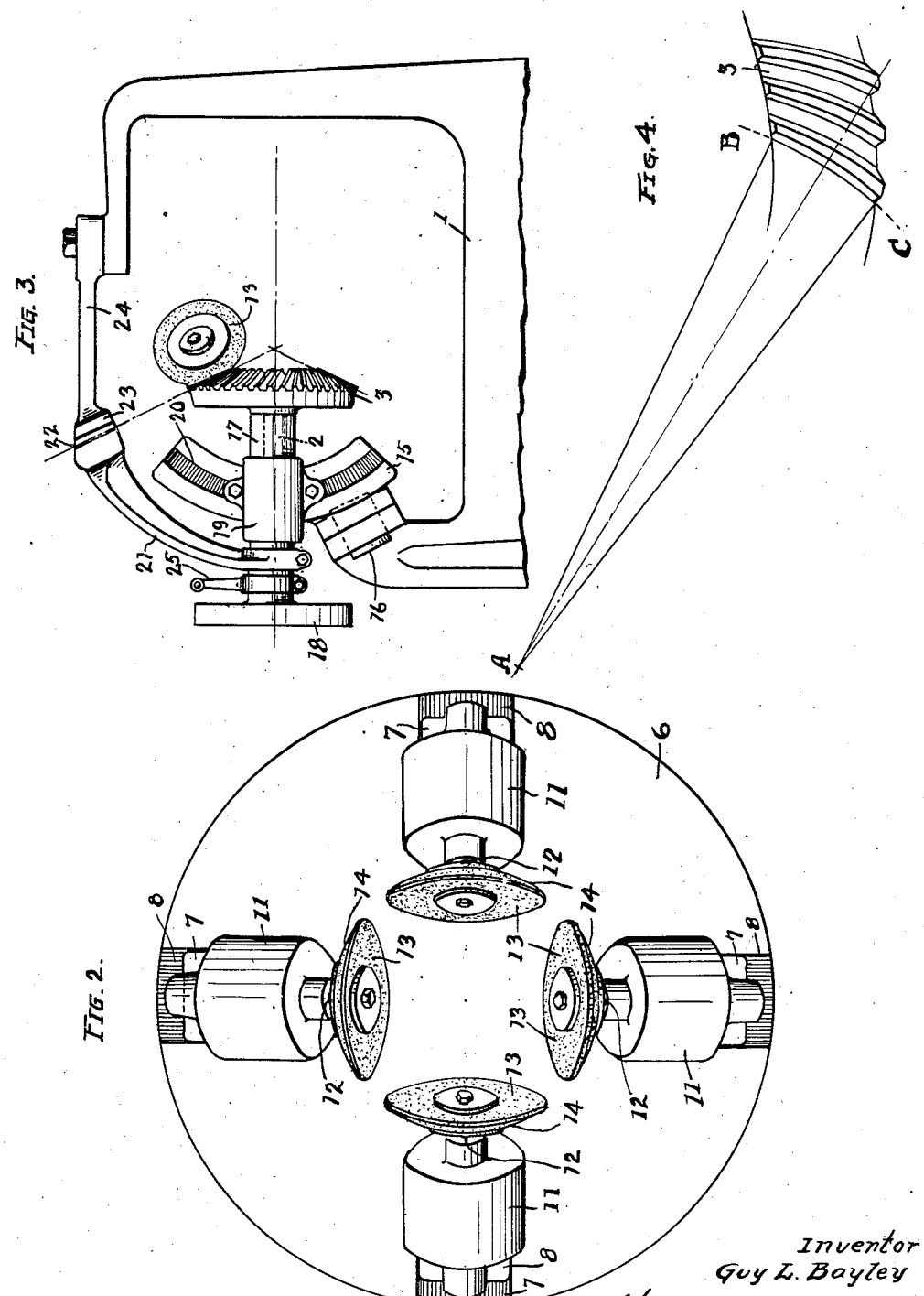
Inventor
Guy L. Bayley
By Kwis Hudson + Kent
Attorneys Patented Apr. 26, 1932

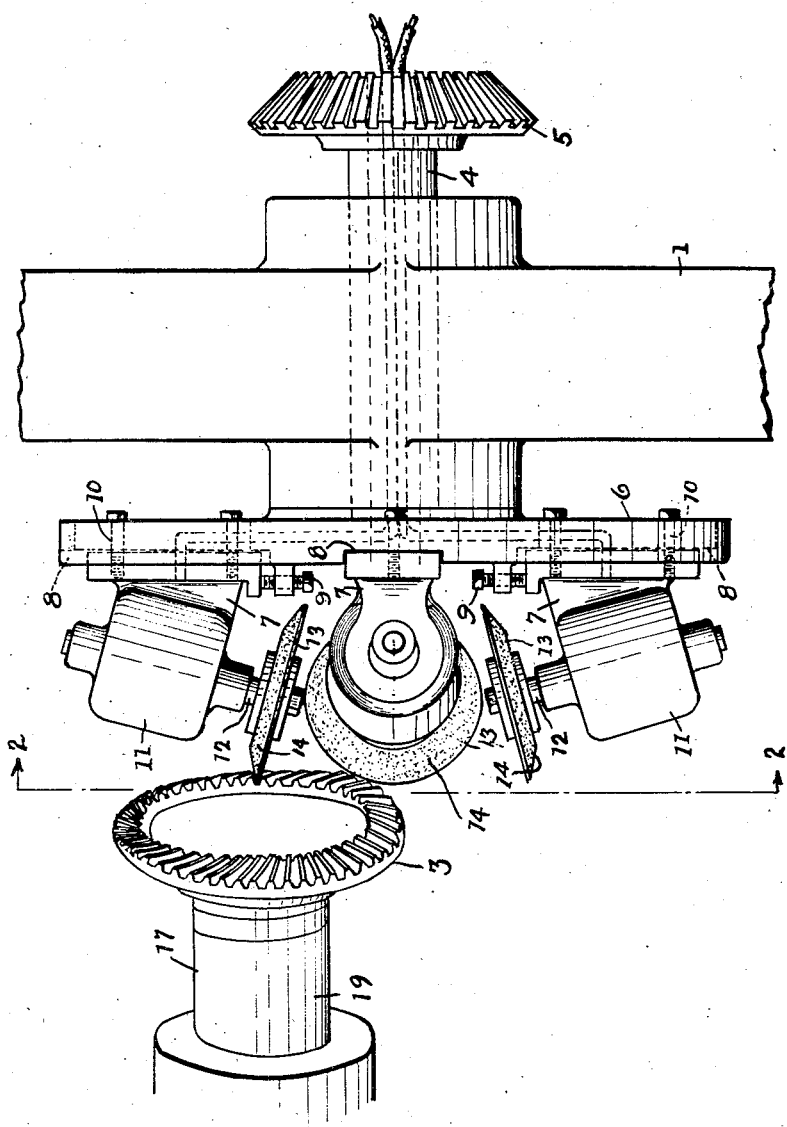

1,855,662

UNITED STATES PATENT OFFICE

GUY L. BAYLEY, OF DETROIT, MICHIGAN, ASSIGNOR TO BEVEL GEAR GRINDING COMPANY, OF DETROIT, MICHIGAN, A CORPORATION OF DELAWARE

MACHINE FOR GENERATING CURVED GEAR TEETH

Application filed December 8, 1926. Serial No. 153,307.

This invention relates to a machine for generating gears with longitudinally curved teeth and more particularly to a machine for generating bevel gears with curved teeth.

An object of the invention is to provide a machine operating upon the molding generating principle in which a cutting element in the form of a disk may be employed to generate gears with longitudinally curved teeth of correct form.

Curved tooth gears may be manufactured in a gear cutting machine operating on the molding generating principle and employing a crown cutter provided with an annular row of projecting teeth which form the grooves of the gear blank and generate the faces of the teeth, or such gears may be formed by the rolling method. In either case it is highly desirable that the tooth faces be accurately finished by grinding them to correct form. Heretofore in so far as I am aware there has been no satisfactory machine operating upon the theoretically correct generating principle for grinding such gears. It has been attempted to substitute a flanged cup shaped grinding wheel for the crown cutter employed for cutting the gears in the generating machine but such a grinding wheel is too fragile to operate satisfactorily.

The present invention has for an object to provide a machine operating on the molding generating principle in which the grinding or cutting element is in the form of a substantially flat disk as distinguished from the crown or cup shaped cutting elements heretofore employed for generating the surfaces of arcuate gear teeth.

With the above and other objects in view the invention may be said to comprise a machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 1 is a fragmentary side elevation showing the gear blank with the cutting elements mounted in operative position with respect thereto.

Fig. 2 is a plan view of the cutter head.

Fig. 3 is a diagrammatic view showing one way in which the relative rolling generating movement between the gear blank and cutting element may be produced.

Fig. 4 is a diagrammatic view showing the form of the curved gear teeth generated by the machine in the present invention.

Referring to the accompanying drawings, the machine is provided with a suitable supporting frame designated by the numeral 1 and upon this frame there is mounted a suitable spindle 2 having means at the end thereof for securing a gear blank 3. The machine herein illustrated is adapted to generate curved teeth on bevel gears and has a cutter spindle 4 journaled in the frame 1 and disposed at an angle to the blank spindle 2 determined by the slope of the pitch cone of the gear to be generated. Since the teeth to be generated are of arcuate form the axis of the cutter spindle 4 is offset with respect to the axis of the blank spindle 2, the axis of the spindle 4 passing through the center of longitudinal curvature of a tooth being generated. As illustrated in Fig. 4 the gear tooth has an arcuate root line C—B, whose center is at A which corresponds to the axis of the cutter spindle 4. Suitable gearing is provided for driving the spindle 4 during the operation of the machine, the rotation being imparted to the spindle through a gear 5 fixed to the spindle.

The spindle 4 at the end thereof adjacent the blank 3 has fixed thereto a head in the form of a disk 6 upon which are mounted a series of movable supports 7 which are mounted in radially disposed guideways 8 in the face of the disk and which are adapted to be adjusted toward or from the center of the disk by means of set screws 9, the support 7 being securely fastened in adjusted positions by means of suitable clamping bolts 10. Each of the supports 7 which are preferably regularly spaced about the axis of the disk carries an electric motor 11 which has a shaft 12 projecting inwardly from the motor toward the axis of the disk. Current for driving the motor 11 may be supplied by suitable conductors extending axially through the cutter spindle which is provided with an axial bore to receive such conducting elements. Upon each of the motor shafts 12 there is fixed a cutting element 13 in the form of a substantially flat disk. As shown herein, the cutting elements 13 are grinding disks which have edge portions 14 which engage with the face of a gear tooth to grind the same, but the invention is not limited to the use of grinding disks but is broad enough to include any other suitable type of cutting element which may be selected for producing the results contemplated by my invention. The tooth engaging surfaces of the grinding disks in radial planes through the axes thereof intersect such radial planes in lines which, upon rotation of the spindle generate a conical surface of revolution coaxial with the cutter spindle, and this cone in which the tooth engaging portions of the grinding disks lie coincides with the flank of a tooth of an imaginary crown gear, conjugate to and meshing with the gear to be ground so that a gear tooth engaging with a grinding disk traveling along a face thereof can roll upon the edge portion of the grinding disk exactly as it would roll upon the face of a tooth of the conjugate crown gear so that by producing the required relative rolling movement between the blank and cutting elements the correct octoid curve can be generated by the grinding disks moving through the grooves between adjacent teeth of the gear blank.

In order to enable the grinding disks to generate the octoid tooth surfaces by the molding generating principle of action it is necessary that the gear blank and grinding disk have a rolling movement, one with respect to the other, corresponding to the relative movement between the finished gear and its conjugate crown gear when one is rolled on the other. In other words, it is necessary that the gear blank and cutting element have a movement, one with the respect to the other, about the axis of the gear blank and that there be a simultaneous correlated relative movement between the gear blank and cutting element about the axis of an imaginary crown gear meshing with the gear blank. This rolling generating movement is well understood in the art and may be produced in a number of ways. One means of producing this movement is illustrated in Fig. 3 of the drawings in which the spindle 2 is shown mounted upon a rocking support 15 which is connected to the frame 1 by a suitable pivot 16, the axis of which coincides with that of a crown gear in mesh with the blank 3. The spindle 2 is journaled within a sleeve 17 which carries at its outer end a suitable indexing head 18 within which there is mounted mechanism for locking the spindle 2 to the sleeve 17 and for turning the spindle 2 at intervals through an angle corresponding to the angular spacing of the teeth to properly position the blank for generating successive teeth, as is well understood in the art. The sleeve 17 is journaled in a suitable bearing member 19 which may be mounted in an arcuate guide 20 having its center of curvature at the apex of the pitch cone of the gear blank so that the spindle may be adjusted to proper positions for gear blanks having different bevel angles. Fixed to the sleeve 17 there is an arm 21 which carries at its outer end a bevel gear segment 22, the teeth of which have their pitch lines in the same cone as the gear blank 3. The segment 22 meshes with a crown gear segment 23 which is fixed to the end of an arm 24 rigidly secured to the frame 1, the axis of the crown gear segment 23 being that of the imaginary crown gear, conjugate to the gear to be generated and in mesh therewith. An actuating arm 25 is fixed to the sleeve 17 and suitable connections may be provided for actuating the arm 25 to oscillate the sleeve 17 and with it the gear blank 3. Turning movement imparted to the sleeve 17 causes the bevel gear segment 22 to roll upon the crown gear segment 23 and imparts a lateral movement to the rocking support 15 about its pivot 16. The combined turning movement of the gear blank 3 and lateral movement about the pivot 16 corresponds exactly to the movement the gear blank would have in rolling upon its conjugate crown gear, and, since the generating surfaces of the cutting elements in their movements about the axis of the cutter spindle 4 describe a surface of revolution corresponding to the flank of the tooth of the imaginary conjugate crown gear engaging the tooth upon which the cutting elements are operating, these cutting elements will generate the correct curve upon the faces of the gear teeth.

When gears of different bevel angles are to be generated it will be necessary to replace the gear segments 22 and 23 with other gear segments corresponding to the gear to be generated and for this reason the arms 21 and 24 are detachably mounted to permit the master gear segments to be changed.

The concave sides of the arcuate gears are generated by the faces on one side of the disks 13 and the convex sides are generated by the faces of the opposite side of the disks, the disks acting upon one face at a time. The radially movable supports 7 permit the disk to be accurately adjusted to the proper position to act upon the teeth of the gear to be generated and after the gear teeth have been ground upon one side other disks may be substituted for acting upon the opposite faces of the teeth, or, if desired, the disks may be so formed that the opposite faces of the same disks may be employed by properly adjusting the supports 7 on the disk 6. The adjustment of the supports 7 also enables the cutting elements to be positioned for gears of different sizes.

Having thus described my invention, what I claim is:

1. In a gear tooth generating machine, a spindle for supporting a gear blank, a cutter spindle having a head, a rotatable cutting element mounted on said head for rotation on an axis disposed transversely with respect to the cutter spindle, means for driving said cutting element, and means for rotating said cutter spindle to cause said cutting element to travel across said blank.

2. In a gear tooth generating machine, a spindle for supporting a gear blank, a cutter spindle having a head, a rotatable cutting element mounted on said head for rotation on an axis disposed transversely with respect to the cutter spindle, means for adjusting said cutting element toward and from the axis of the cutter spindle, means for driving said cutting element, and means for rotating said cutter spindle to cause said cutting element to travel across said blank.

3. In a gear tooth generating machine, a spindle for supporting a gear blank, a cutter spindle having a head, rotatable cutting elements mounted on said head for rotation on axes disposed transversely with respect to the cutter spindle, means for adjusting said cutting elements toward and from the axis of the cutter spindle, means for driving said cutting elements, and means for rotating said cutter spindle to cause said cutting elements to travel across said blank.

4. In a gear tooth generating machine, a spindle for supporting a gear blank, a cutter spindle having a head, a rotatable cutting element mounted on said head for rotation on an axis disposed transversely with respect to the cutter spindle, means for driving said cutting element, means for rotating said cutter spindle to cause said cutting element to travel across said blank, and means for causing a relative rolling generating movement between the cutting element and blank.

5. In a machine for generating curved teeth on bevel gears, a spindle for supporting a bevel gear blank, a cutting element in the form of a disk, means for rotating said disk about its own axis and for simultaneously moving the same about the center of longitudinal curvature of a gear tooth, and means for causing a relative movement between the blank and cutter corresponding to the movement the bevel gear would have with respect to a tooth of a conjugate crown gear in rolling upon said crown gear.

6. In a machine for generating curved teeth on bevel gears, a spindle adapted to support a gear blank on one end thereof, a cutter spindle disposed at an angle to said blank spindle and offset with respect thereto, a head fixed to the cutter spindle adjacent the gear blank, a series of grinding disks on said head mounted to rotate on axes extending laterally with respect to the cutter spindle, said grinding disks having gear tooth engaging portions lying in a cone coaxial with the cutter spindle, means for driving said grinding disks, means for rotating said cutter spindle, and means for causing relative movements between said gear blank and a cutter engaging therewith corresponding to the relative movements the bevel gear would have with respect to its conjugate crown gear if rolled thereon.

In testimony whereof, I hereunto affix my signature.

GUY L. BAYLEY.